United States Patent
Westergaard Andersen

(10) Patent No.: US 9,701,479 B2
(45) Date of Patent: Jul. 11, 2017

(54) IN-FEED FOR PRODUCT SUPPORT CONVEYOR

(71) Applicant: AMMERAAL BELTECH MODULAR A/S, Vejle (DK)

(72) Inventor: Kenneth Westergaard Andersen, Vejle Øst (DK)

(73) Assignee: AMMERAAL BELTECH MODULAR A/S, Vejle (DK)

( * ) Notice: Subject to any disclaimer, the term of this patent is extended or adjusted under 35 U.S.C. 154(b) by 0 days.

(21) Appl. No.: 14/760,937

(22) PCT Filed: Jan. 14, 2014

(86) PCT No.: PCT/DK2014/050007
§ 371 (c)(1),
(2) Date: Jul. 14, 2015

(87) PCT Pub. No.: WO2014/111092
PCT Pub. Date: Jul. 24, 2014

(65) Prior Publication Data
US 2015/0360871 A1    Dec. 17, 2015

(30) Foreign Application Priority Data

Jan. 15, 2013 (DK) ................................ 2013 70021
Apr. 5, 2013 (DK) ................................ 2013 70188
Apr. 10, 2013 (DK) ................................ 2013 70199

(51) Int. Cl.
*B65G 17/46* (2006.01)
*B65G 17/08* (2006.01)
*B65G 17/18* (2006.01)

(52) U.S. Cl.
CPC ............. *B65G 17/46* (2013.01); *B65G 17/08* (2013.01); *B65G 17/18* (2013.01)

(58) Field of Classification Search
CPC ........ B65G 15/44; B65G 17/08; B65G 17/16; B65G 17/18; B65G 17/46; B65G 17/48
See application file for complete search history.

(56) References Cited

U.S. PATENT DOCUMENTS 3,561,907 A * 2/1971 Campbell .............. B65G 15/44
 198/699.1
5,927,478 A   7/1999 Archer
(Continued)

FOREIGN PATENT DOCUMENTS

| WO | 9948779 A1 | 9/1999 |
| WO | 2008076732 A2 | 6/2008 |
| WO | 2009026536 A1 | 2/2009 |

*Primary Examiner* — Gerald McClain
*Assistant Examiner* — Keith R Campbell
(74) *Attorney, Agent, or Firm* — William H. Honaker; Dickinson Wright PLLC

(57) ABSTRACT

A conveyor having an endless conveyor belt made from a plurality of hingedly connected modular belt modules limited by two longitudinal sides. Each module comprises one or more upper parts and a lower part each pivotably connectable to a forwardly arranged belt module. One or more upper parts are provided with means projecting below the lower part at least when the one or more upper parts are in the same plane as the lower part. A feeding station is arranged on the conveyor's substructure and includes two side walls arranged parallel to a travelling direction of the conveyor belt and substantially orthogonal to the plane of the conveyor belt's surface. An end wall spans between the two walls leaving a gap between the upper surface of the conveyor belt and the lower edge of the end wall.

11 Claims, 5 Drawing Sheets

(56) References Cited

U.S. PATENT DOCUMENTS

| | | | | |
|---|---|---|---|---|
| 6,390,285 B2* | 5/2002 | de Geus | ............... | B65G 17/08 198/732 |
| 7,198,148 B1* | 4/2007 | Witkus | ............... | B65G 17/08 198/845 |
| 7,770,718 B2* | 8/2010 | Fourney | ............... | B65G 17/24 198/463.3 |
| 8,109,384 B2* | 2/2012 | Pressler | ............... | B65G 17/24 198/459.7 |
| 8,221,047 B2* | 7/2012 | Petersen | ............ | A01C 15/003 198/312 |
| 8,544,634 B2* | 10/2013 | Fourney | ............... | B65G 47/29 198/459.7 |
| 8,701,871 B2* | 4/2014 | Fourney | ............... | B65G 17/24 198/697 |
| 8,967,940 B2* | 3/2015 | Petersen | ............ | A01C 15/003 198/312 |
| 8,985,311 B2* | 3/2015 | Stockholm Johansson | ............ | B65G 17/18 198/497 |
| 2009/0050449 A1* | 2/2009 | Boele | ............... | B65G 17/08 198/735.2 |
| 2012/0241292 A1 | 9/2012 | Fourney | | |

* cited by examiner

IN-FEED FOR PRODUCT SUPPORT CONVEYOR

CROSS REFERENCE TO RELATED APPLICATION

This application claims the benefit of PCT International Application Serial No. PCT/DK2014/050007 filed on Jan. 14, 2014, which claims priority to PA 2013 70021 filed on Jan. 15, 2013, PA 2013 70188 filed on Apr. 5, 2013, PA 2013 70199 filed on Apr. 10, 2013, the entire disclosures of which are incorporated herein by reference.

FIELD OF THE INVENTION

The present invention relates to a conveyor and more particular to a conveyor of the type having an endless conveyor belt arranged around two cylinders where the conveyor belt defines a transport path and a return path. The conveyor belt is of the type having upstanding flanges in the belts surface-so called flights or product supports.

BACKGROUND OF THE INVENTION

The conveyor belt itself is particular in that it is possible to activate the conveyor belt such that at least part of the module's surface may be angled relative to the conveyor belt's surface whereby for example a flight also known as a product support may be created or link dividers or side guards may be activated. Flights and side guards are typically used on for example inclined conveyor structures in order to be able to lift products up an incline and at the same time maintain products on a flat conveyor belt even if there is no inclination.

Special problem arises, particularly with respect to loading of products onto these types of conveyor belts comprising flights as the height of the flight necessitates that a connecting conveyor must be arranged either above, below or at a certain lateral distance to the conveyor including the flights. Furthermore, there are hygienic issues which need to be specifically addressed relating to conveyors including flights. Particularly some of the conveyors in the prior art have movable parts and do have problems of a hygienic character, particularly when treating/conveying foodstuffs.

OBJECT OF THE INVENTION

It is therefore an object of the present invention to provide a conveyor structure including a conveyor belt which alleviates these problems and provides additional advantages.

DESCRIPTION OF THE INVENTION

The invention addresses this by providing a conveyor of the type having an endless conveyor belt arranged around two cylinders one cylinder arranged in each end of the conveyor belt, said conveyor belt defining a transport path and a return path, wherein in a first end of the transport path a feeding station is arranged, where said cylinders and said feeding station are arranged on a conveyor carrying structure, and where the endless conveyor belt is made from a plurality of modular belt modules, where adjacent modules in the transport direction are hingely connected and where at least one module has a width, and a length, where the width and length defines a plane, and a thickness orthogonal to said plane, such that the basic module is limited by two longitudinal sides, and a front and rear side, where the module comprises one or more upper parts and a lower part, both the one or more upper and lower part(s) being pivotably connectable in use to a forwardly arranged belt module, whereas only the bottom part is connected in use to a rearwardly arranged belt module, and where said one or more upper parts is provided with means projecting below said lower part at least when the one or more upper parts is in the same plane as said lower part;

said feeding station arranged on the conveyors substructure comprises two side walls arranged such that the planes of the walls are parallel to the travelling direction of the conveyor belt and substantially orthogonal to the plane of the conveyor belt's surface, and an end wall spanning between the two walls across the conveyor belt, leaving a gap between the upper surface of the conveyor belt and the lower edge of said endwall.

The definition of longitudinal sides refers to the longitudinal extent of the entire conveyor corresponding to the conveyor belt's travelling direction.

Within this application and in particular with respect to the claims the terms "forwardly" and "rearwardly" shall be understood in the following manner. When the modular belt modules are assembled to a conveyor belt and arranged on a suitable sub-structure comprising conveyor belt drive means the conveyor belt will be activated to convey products in one direction. This direction is called the upstream direction. For a particular belt module, this module will be connected to adjacent belt modules along two opposing module sides. Towards the upstream direction is the forwardly arranged belt module and in the opposite direction, downstream direction is the rearwardly arranged belt module.

As the flights, i.e. the upper parts of the first modules, are pivotable and therefore may be brought into a position where the upper part is substantially flush with the conveyor belt and another position where the upper part is raised relative to the conveyor belt due to the engagement of the means projecting below the lower part, it is possible to not have activated the upper part just before it enters the feeding station such that by providing a gap between the upper surface of the conveyor belt and the lower edge of the end wall, the conveyor belt including the upper part may enter the in-feed station without further obstructions. Due to the collapsed nature of the product support (the upper part), the gap can be kept relative small, hindering products/objects from falling off the conveyor. It therefore becomes possible to feed or place materials to be conveyed directly into the in-feed station, and arranged the in-feed station close to or superposed the end of the conveyor.

The upper part may be activated in the in-feed station such that it will function as a flight or product support immediately in the in-feed station. Obviously, it will also be possible to only activate the upper part further downstream depending on the application and design of the sub-structure.

The belt modules as such are already the object of an earlier patent application by the same applicant which has been filed and provided with Danish patent application No. PA 2013 70021, now published as WO2014111091.

The belt modules are assembled from at least two distinct parts: an upper and a lower part. They are typically assembled by inserting a connection pin (generally known in the art) through overlapping apertures in the eye parts. In this manner the two parts may pivot relative to each other. The means projecting below the plane of the conveyor will typically be an integrated part of the upper part, where a passage is provided in the lower part allowing the means projecting below the plane of the conveyor to pass through the lower part unhindered.

Further embodiments are disclosed in the dependent claims. However, a few embodiments shall be emphasized in this connection.

In an advantageous embodiment the gap between the end wall's lower edge and the surface of the conveyor belt is provided with flexible closure means, where said closure means are selected among one or more of the following: brushes, plastic or rubber lip, resilient metal springs.

In this manner it is possible to use the in-feed station also with very small items such as for example peas or other small foodstuff items in that the closure means will hamper any exit of objects to be conveyed through the gap.

The same is true for the further embodiment where the closure member is arranged pivotally and therefore may be a stiff member as such. Naturally, the pivotal action shall occur in the direction of belt travel such that the pivotal action will turn into the in-feed station.

A further advantageous embodiment which needs to be mentioned in this connection is an embodiment where two or more upper parts are provided, where each upper part is arranged parallel to the longitudinal sides, and where each upper part comprises a surface arranged perpendicular to the surface of the conveyor belt, where said surface is not projecting above the surface of the conveyor belt, when said means projecting below said lower part is projecting below said lower part, and where, when the means projecting below said lower part is urged upwards against the underside of the lower part, the surface of the upper parts projects above the surface of the conveyor belt.

In this manner it is possible to provide side guards to this conveyor belt and still allow the conveyor belt to collapse as it enters the in-feed station which provides a very versatile conveyor belt structure.

A further possibility with this embodiment is to divide the conveyor belt up into different separated lanes, where each lane is separated by the elevated plates. In this configuration it is possible to allow objects to enter the conveyor from both sides, and/or to convey different types of objects on the same conveyor. An example may be different meat cuttings which needs to be treated to similar treatments, such that one common conveyor is provided through the common treatment tunnel/apparatus, but carrying different separated cuts. In this manner it is also possible to vary the capacity of the conveyor with respect to one type or the other, depending on the desired throughput.

DESCRIPTION OF THE DRAWING

The invention will now be explained with reference to the accompanying drawings wherein
FIG. 4a illustrates an embodiment provided with two pivotal members

DETAILED DESCRIPTION OF THE INVENTION

Figure 1:
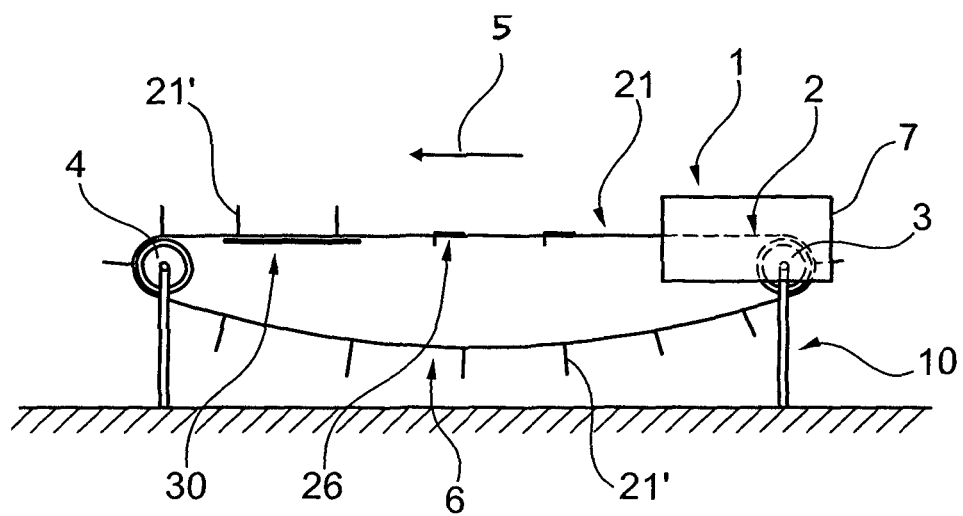
FIG. 1 illustrates a conveyor according to the present invention
Figure 2:
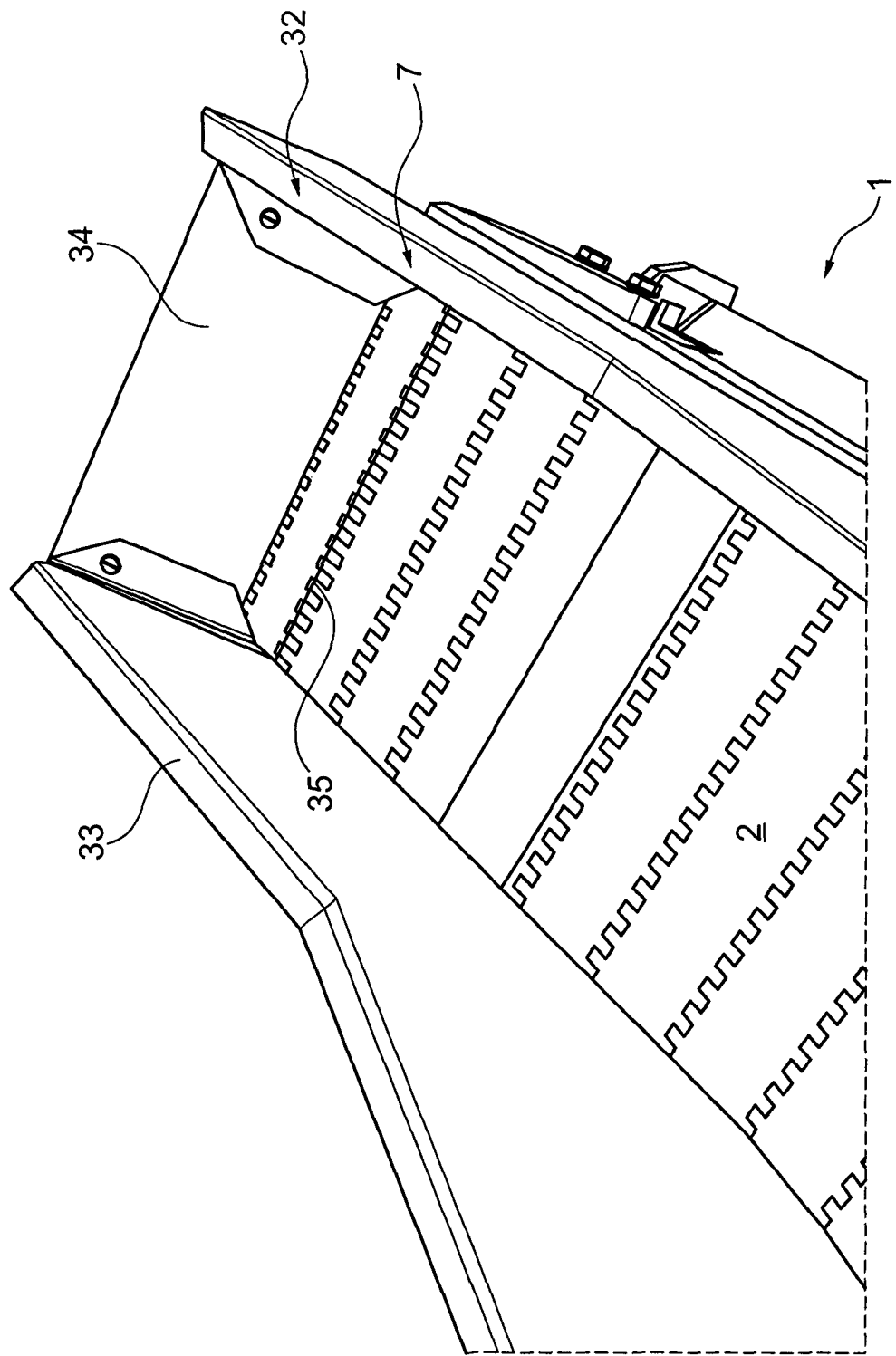
FIG. 2 illustrates a lower end of an inclined conveyor

FIG. 1 is a very schematic illustration of a conveyor according to the present invention. The conveyor 1 has an endless conveyor belt 2 arranged around two cylinders 3, 4 arranged in each end of the conveyor belt. The conveyor belt defines a transport path where the transport direction is indicated by the arrow 5 and a return path 6. In the first end of the transport path is arranged a feeding station 7 which is also illustrated in FIG. 2.

The cylinders and their axles, motors, electrical controllers etc., feeding station and so forth are all arranged on a substructure which is only schematically illustrated as 10.

Figure 3:
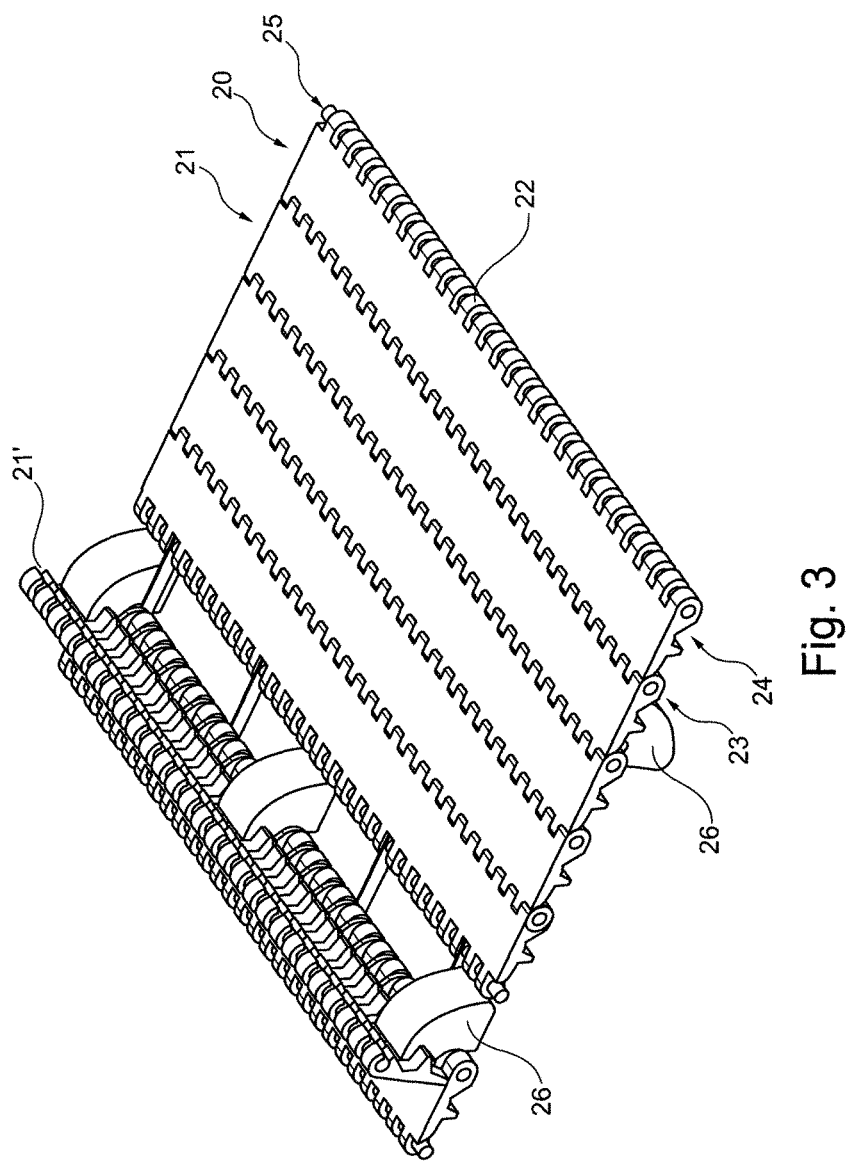
FIG. 3 illustrates a plurality of modular belt modules

The endless conveyor is made from a plurality of modular belt modules as illustrated in FIG. 3. In this embodiment two different types of modules 20, 21 are hingely connected by providing eye parts 22 along front and rear sides 23, 24 and by intermeshing the eye parts 22 along the front side 23 of one module with corresponding offset eye parts along a rear side on an adjacent module and inserting a connection pin 25 through overlapping apertures in the eye parts 22. In this connection it should, however, be noted that other means for connecting adjacent belt modules are also used in the technical field. As is evident from FIG. 3 two different modules 20, 21 are used in the construction of this modular conveyor belt. The belt modules 21 are special in that they have means 26 projecting below the lower surface of the conveyor belt such that if/when the means 26 are engaged, for example by a rail as will be explained with reference to FIG. 1 below, the upper part of the conveyor belt pivots into a raised position as indicated by 21'. In this position it functions as a product support or flight and will be able to convey products on the conveyor belt, for example of an implant where the products otherwise would slide down the conveyor belt.

In FIG. 1 is illustrated a conveyor belt of the type as described above with reference to FIG. 3 and on the transport path is illustrated upper parts being in a non-elevated state, where the projecting means 26 are below the lower surface of the conveyor belt. Along the transport path is arranged an engagement rail 30 immediately below the lower surface of the conveyor belt such that as the means 26 engage the rails 30 the upper part of the first modules will pivot into the raised position as indicated by 21'. On the return path depending on the relative dimensions of the means 26 and size of the upper part 21 the first modules will tend to "open", i.e. have the upper part in the raised position 21' facilitating cleaning etc. by providing an engagement rail 30 immediately adjacent the cylinder 3 it is possible to close the modules again such that they will be able to enter into the feed box 7 through a gap as will be explained below with reference to FIG. 2.

Turning to FIG. 2 a perspective view of a conveyor according to the present invention is illustrated. FIG. 2 illustrates a lower end of an inclined conveyor where a feeding station 7 is arranged adjacent the end of the conveyor belt. The feeding station in this embodiment comprises two substantially parallel side walls 32, 33 delimiting the sides of the conveyor belt 2. Between the two side walls 32, 33 is arranged and end wall 34 such that the side walls and the end walls provide a feeding station where objects to be conveyed on the conveyor 2 may be placed.

In order to allow the upper part of the modules 21 to pass into the feeding station a gap 35 is provided between the lower edge of the end wall 34 and the upper part of the conveyor belt 2. Naturally, the gap 35 should be as small as possible in order to hinder any products placed in the feeding station 7 to accidentally fall off the conveyor at the rear end. For these purposes as in embodiments already mentioned above it may be possible either with flexible of pivotal means to arrange a closure member in the gap 35.

Figure 4:
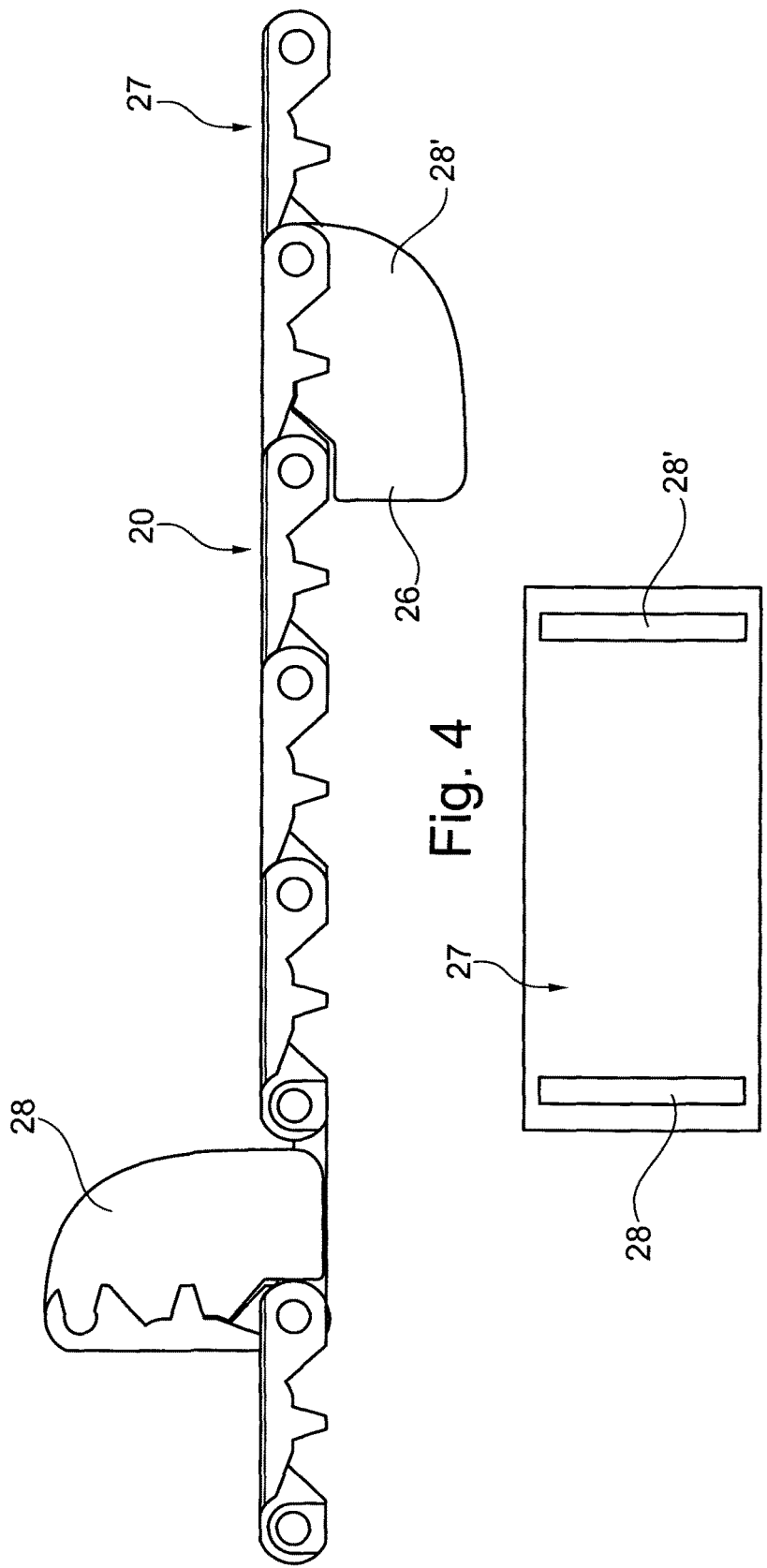
FIG. 4 illustrates a special embodiment of the invention

Turning to FIG. 4 a special embodiment of the invention is illustrated where the conveyor belt is made up of two types of modules 20, 27 the modules 27 are in this embodiment provided with two pivotal members 28, 28' as illustrated in FIG. 4a. The pivotal members 28, 28' are arranged along either side of the module 27 such that when the engagement means 26 engages a rail, for example a rail 30 as illustrated in FIG. 1, the plates 28, 28' will flip up and constitute side guards along the side edges of the conveyor belt and in this manner protect objects being conveyed from falling off the conveyor. This embodiment is particularly useful where the feed station is arranged such that it is desirable to feed objects from the side onto the conveyor. Therefore, by having a portion of the conveying path 5 without the rail 30 the side guards 28, 28' will be lowered allowing objects to be introduced onto the conveyor from the side and then as the engagement means 26 engages a rail 30 the side guards will be raised thereby keeping objects on the conveyor belt.

Figure 5:
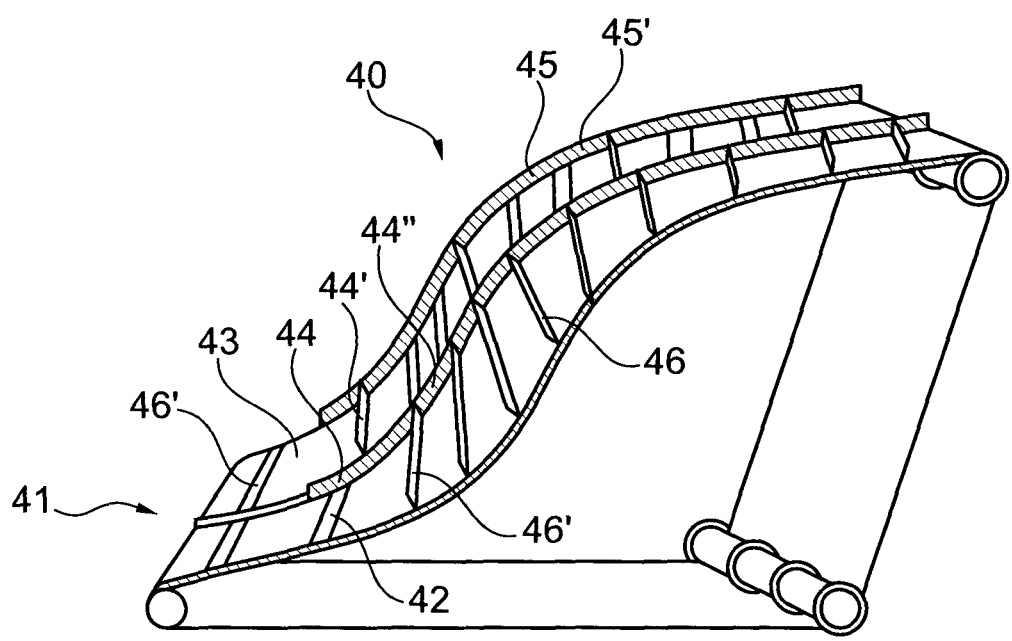
FIG. 5 illustrates an inclined conveyor

In FIG. 5 is schematically illustrated an inclined conveyor 40. The conveyor belt 41, has a width allowing for two separate conveying lanes 42,43. The lanes are separated by dividers 44,44',44" . . . , in this embodiment substantially arranged down the middle of the conveyor belt 41. In order to activate the dividers the, like the upper parts of the belt modules, as explained above; are provided with means extending below the lower part of the belt module. Along the middle of the conveyor belts' path is arranged engagement rails (not illustrated), engaging the means and thereby activating the dividers 44,44',44" . . . , i.e elevating them into the position illustrated.

Along the sides of the conveyor belt 41 is provided side guards 45, 45' . . . , substantially creating a closed side barrier on the conveyor belt 41. The side guards 45,45' . . . are activated in the same manner as the dividers and as the product supports explained above.

In the illustrated embodiment the product supports in one lane 42 are activated at closer intervals than in the other lane 43. This provides the possibility to convey two different types of products, or quantities at the same time. The flights 46 are positioned at equal distance in both lanes, as belt modules having upper and lower parts are positioned in the conveyor belt at the same regular intervals. Due to the arrangement of the engagement rails (not illustrated) underneath the conveyor, and the position of engagement means on the upper part of the belt modules it becomes possible to activate different flights at different times. As illustrated some upper parts/flights 46' are not activated whereas other flights/upper parts 46 are activated.

The conveyor belt 41 illustrated in FIG. 5 may be made from one single link spanning the entire width, where the sideguards 45, dividers 44 and flights 46are arranged in a common lower part of the bet module, or the conveyor belt may be made of of a number of separate modular belt links assembled laterally across the width of the conveyor.

The invention has now been explained with reference to some advantageous embodiments, but it is clear that further and more elaborate embodiments are possible within the scope of the appended claims.

What is claimed is:

1. Conveyor having an endless conveyor belt arranged around two cylinders one cylinder arranged in each end of the conveyor belt, said conveyor belt defining a transport path and a return path, wherein in a first end of the transport path a feeding station is arranged, where said cylinders and said feeding station are arranged on a conveyor carrying structure, and where the endless conveyor belt is made from a plurality of modular belt modules, where adjacent modules in the transport direction are hingely connected and where at least one module has a width, and a length, where the width and length define a plane, and a thickness orthogonal to said plane, such that the module is limited by two longitudinal sides, and a front and rear side, where the module comprises one or more upper parts and a lower part, both the one or more upper parts and the lower part being pivotably connectable in use to a forwardly arranged belt module, whereas only the lower part is connected in use to a rearwardly arranged belt module, and where said one or more upper parts are provided with means projecting below said lower part at least when the one or more upper parts are in the same plane as said lower part to pivot said one or more upper parts from a non-elevated position wherein said one or more upper parts are substantially flush with said plane of said conveyor belt to a raised position wherein said one or more upper parts are disposed substantially perpendicular to said plane of said conveyor belt to define a raised height of said one or more upper parts extending from said plane of said conveyor belt to an end of said one or more upper parts in said raised position;

said feeding station arranged on the conveyor's substructure comprises two side walls arranged such that the planes of the walls are parallel to the travelling direction of the conveyor belt and adjacent to the belt's longitudinal sides and substantially orthogonal to the plane of the conveyor belt's surface, and an end wall spanning between the two walls across the conveyor belt, leaving a gap between the upper surface of the conveyor belt and the lower edge of said end wall being less than said raised height of said one or more upper parts in said raised position.

2. Conveyor according to claim 1 where the means arranged on the upper parts of said belt modules, projecting below the lower part, have an extent allowing the upper part to pivot into said raised position, when said means are brought flush with the underside of the lower part.

3. Conveyor according to claim 1 where said conveyor structure further comprises one or more activating rails, arranged under the conveyor belt's path, in positions where it is desirable to engage the means projecting below said lower part of the first type of module, such that the means projecting below said lower part of the module will engage said one or more activating rails thereby pivoting the upper parts of the first module from said non-elevated position to said raised position, and where said one or more activating rails only are arranged downstream from said end wall.

4. Conveyor according to claim 1 wherein the gap between the end wall's lower edge and the surface of the conveyor belt is provided with flexible closure means, where said closure means are selected among one or more of the following: brushes, plastic or rubber lip, resilient metal springs.

5. Conveyor according to claim 1 wherein the gap between the end wall's lower edge and the surface of the conveyor belt is provided with a pivotal closure member.

6. Conveyor according to claim 1 wherein two or more upper parts are provided, where each upper part is arranged parallel to the longitudinal sides, and where each upper part comprises a surface arranged perpendicular to the surface of the conveyor belt, where said surface is not projecting above the surface of the conveyor belt, when said means projecting below said lower part is projecting below said lower part, and where, when the means projecting below said lower part is urged upwards against the underside of the lower part, the surface of the upper parts projects above the surface of the conveyor belt.

7. Conveyor according to claim 6 wherein a corresponding number of activating rails to the number of upper parts are arranged laterally on the sub structure, arranged under the conveyor belt's path, where each rail is arranged in positions where it is desirable to engage the means projecting below said lower part of the first type of module, such that the means projecting below said lower part of the module will engage said one or more activating rails thereby pivoting one or more upper parts of the first module from said non-elevated position to said raised position.

8. Conveyor according to claim 1 wherein the upper part has one or more means projecting below said lower part arranged across the belt module, and where the upper part is a single element.

9. Conveyor according to claim 8 wherein the single element has a number of fingers projecting away from the front side.

10. Conveyor according to claim 1 where laterally across the conveyor belt's surface two or more upper parts are provided, and where the substructure is provided with a number of activating rails, whereby the upper parts, both the laterally arranged and the upper parts arranged in the travelling direction of the conveyor belt, may be activated in any desired position and time.

11. Method of transporting objections on a conveyor, comprising:
    providing an endless conveyor belt made from a plurality of modular belt modules, where adjacent modules in the transport direction are hingely connected and where at least one module has a width, and a length, where the width and length define a plane, and a thickness orthogonal to said plane, such that the module is limited by two longitudinal sides, and a front and rear side, where the module comprises one or more upper parts and a lower part, both the one or more upper parts and the lower part being pivotably connectable in use to a forwardly arranged belt module, whereas only the lower part is connected in use to a rearwardly arranged belt module, and where said one or more upper parts are provided with means projecting below said lower part at least when the one or more upper parts are in the same plane as said lower part to pivot said one or more upper parts from a non-elevated position wherein said one or more upper parts are substantially flush with said plane of said conveyor belt to a raised position wherein said one or more upper parts are disposed substantially perpendicular to said plane of said conveyor belt to define a raised height of said one or more upper parts extending from said plane of said conveyor belt to an end of said one or more upper parts in said raised position; and
further providing a feeding station arranged on the conveyor's substructure and including two side walls arranged such that the planes of the walls are parallel to the travelling direction of the conveyor belt and adjacent to the belt's longitudinal sides and substantially orthogonal to the plane of the conveyor belt's surface, and an end wall spanning between the two walls across the conveyor belt, leaving a gap between the upper surface of the conveyor belt and the lower edge of said end wall being less than said raised height of said one or more upper parts in said raised position;
wherein objects are introduced into the feeding station, and where engagement rails arranged underneath the conveyor belt in the feeding station engage means projecting beneath the lower part of a first type of modules thereby pivoting the upper part of the module into said raised position thereby creating a product support.

* * * * *